March 8, 1966  R. E. BOWLES  3,238,959
DIFFERENTIATOR COMPARATOR
Filed May 31, 1963  3 Sheets-Sheet 1

INVENTOR,
ROMALD E. BOWLES
BY Harry M. Saragovitz,
Edward J. Kelly,
Herbert Berl &
J. D. Edgerton  ATTORNEYS.

March 8, 1966   R. E. BOWLES   3,238,959
DIFFERENTIATOR COMPARATOR

Filed May 31, 1963   3 Sheets-Sheet 2

INVENTOR,
RONALD E. BOWLES

BY Harry M. Saragovitz,
Edward J. Kelly,
Herbert Berl &
J. P. Edgerton   ATTORNEYS

INVENTOR,
ROMALD E. BOWLES

BY Harry M. Saragovitz,
Edward J. Kelly,
Herbert Berl &
J. P. Edgerton     ATTORNEYS.

United States Patent Office 3,238,959
Patented Mar. 8, 1966

3,238,959
DIFFERENTIATOR COMPARATOR
Romald E. Bowles, Silver Spring, Md., assignor to the United States of America as represented by the Secretary of the Army
Filed May 31, 1963, Ser. No. 284,759
8 Claims. (Cl. 137—81.5)
(Granted under Title 35, U.S. Code (1952), sec. 266)

The invention described herein may be manufactured and used by or for the Government for governmental purposes without the payment to me of any royalty thereon.

This invention relates generally to pure fluid systems and more specifically to a pure fluid differentiator comparator for comparing and for differentiating fluid input signals without the use of any moving mechanical parts.

A pure fluid differentiator comparator in accordance with the present invention comprises basically a pure fluid comparator coupled to means for differentiating the increase or decrease in magnitude of an input fluid signal supplied to the comparator. Considering the pure fluid comparator, per se, a pure fluid comparator is essentially an analog component that in effect compares the instantaneous magnitudes of at least two input fluid signals and produces an output signal corresponding to the differentials in magnitude that instantaneously exist between the two signals.

The fluid comparator disclosed by the present invention, does not incorporate any moving parts other than the operating fluid, and therefore does not suffer from the disadvantages normally associated with mechanically moving elements which are employed in existing mechanical comparators. In known mechanical comparators, frictional forces that are developed by interacting mechanical parts such as valves and pistons create heat and wear in the device adversely effecting reliability of devices incorporating such moving parts. In addition, the inertia of the moving parts in conjunction with the associated frictional forces increase the overall response time of the device. Since a comparator is required to respond to recurring changes of some condition, for instance, a change of fluid pressure, a short time constant is an important advantageous characteristc. It is, therefore, primarily important to reduce or eliminate, if possible, all moving mechanical parts from the comparator mechanism. The fluid comparator of the instant invention employs only fluid input signals to operate; all mechanical elements or components forming the unit remain stationary during operation thereof, so that the comparator may have a minimum response time to a change in fluid input signal.

Another important consideration in the design of any pure fluid differentiator system is the residual hysteresis characteristic of the system.

It is generally necessary that the response time and percentage change of signal required to produce switching of output channels is minimal. Systems having low residual hysteresis characteristics are most desirable and the residual hysteresis of a pure fluid comparator is usually less than that of known comparators of a mechanical type that employ moving parts.

As contemplated in the instant invention, a typical fluid comparator comprises a plurality of angularly disposed nozzles having the outlet orifices thereof extending through an end wall of an interaction chamber. The nozzles are positioned at an angle less than 180° relative to one another such that fluid jets issuing therefrom and having at least a predetermined minimum pressure for which the unit is designed angularly intercept one another in the interaction chamber.

The interaction chamber is defined in a typical case by an end wall and two outwardly diverging sidewalls hereinafter referred to as the left and right sidewalls, enclosed by planar top and bottom walls. In the present invention, the detailed contours of the sidewalls of the chamber in which the essentially planar streams interact are of secondary importance to the interacting forces between the streams themselves. Although the sidewalls may be used to confine the fluid to the interacting chamber and thus make it possible to have the streams interact in a region at some desired pressure, the sidewalls are preferably positioned so that they are remote from the high velocity portions of the interacting streams. Thus, the interaction between the streams and consequently the final direction of the combined streams is a function of the relative momenta of the two streams with the sidewalls having little effect on the results of the interaction.

A V-shaped divider is disposed at a predetermined distance from the end wall with the apex of the divider disposed along the centerline between the orifices of the nozzles, the sides of the divider being generally parallel to the left and right sidewalls of the chamber. The regions between the sides of the divider and the left and right sidewalls define left and right output passes, respectively.

With regard to the aforementioned nozzles, the left nozzle of the pair is positioned with respect to the divider and the interaction chamber so that it discharges all or essentially all of its stream into the right passage, the right nozzle being correspondingly positioned to discharge all or essentially all of its stream into the left passage, the nozzles having substantially equal cross-sectional areas.

To effect a pressure comparison, fluid at some predetermined pressure is supplied, for example to the left nozzle and a well-defined stream issues from that nozzle into the interaction chamber. All, or substantially all of this fluid is directed into the right output passage. Input fluid signals which may take the form of fluctuations of pressure, either decreasing or increasing, for example, are supplied to the right nozzle and these signals interact to deflect the stream issuing from the left nozzle to a degree dependent upon relative momenta of the input signal discharging from the right nozzle and the fluid stream discharging from the left nozzle. The momentum vector of a stream depends upon the size, speed, direction and density of the fluid stream. In a comparator where the nozzle sizes are equal and the fluids are the same, then equal pressures applied to the fluids and supplied to the two nozzles produce interacting streams of equal mass flows and equal momenta. Therefore, a null in such a system indicates an equality of the two input signals based on the above three basic parameters of fluid flow and for a symmetrical system will provide equal flows from the output passages. If it is desired, however, to separate the effect of these three parameters and detect the null condition for only one of them; for instance, pressure, then pressure differentials must be developed between the interacting streams while the other parameters are maintained constant until the null condition; that is, equal output signals indicating equal input pressures, is created.

As the pressure differentials increase or decrease from the null condition, the combined stream will move as a beam across the apex of the divider and the relative proportions of fluid entering the two outlet passages are varied correspondingly. The pressure differences between the input signals may then be measured by determining the difference in fluid pressures or flow in the two outlet passages.

A tube or duct for supplying fluid input signals from a source of fluid signals is coupled to the nozzles of the comparator through one duct or tube having a fluid resistor therein, and through another duct or tube having a fluid resistor and a fluid capacitor therein. The fluid resistor in each duct resists the flow of fluid through both ducts to the nozzles of the comparator and the fluid capacitor in the other duct or tube stores the kinetic energy of the fluid as potential energy. As a result of coupling the two ducts to the source of input fluid signals and to the nozzles of the comparator, the signal supplied to the comparator will be differentiated, and the rate of change with respect to time of any of the three basic parameters can be detected by conventional measuring devices applied across the output passages of the fluid comparator.

Broadly, therefore, it is an object of this invention to provide a fluid differentiator comparator having no moving mechanical parts.

More specifically, it is an object of this invention to provide a pure fluid differentiator comparator including a pure fluid comparator and means for supplying fluid streams to the comparator from a source of fluid input signals such that the wave form of the difference between fluid output signals from the comparator is a function of the differential of the input signal wave form.

Another object of this invention is to provide a fluid differentiator comparator including a fluid comparator having at least a pair of nozzles, the nozzles receiving fluid signals from a system having respective resistive and resistive and capacitive properties, the system receiving fluid input signals from a duct or tube, and being designed so that the output signal issuing from the comparator is the differential of the fluid input signals supplied to the system.

The above and still further objects, features and advantages of the present invention will become apparent upon consideration of the following detailed description of one specific embodiment thereof, especially when taken in conjunction with the accompanying drawings, wherein.

Figure 6:
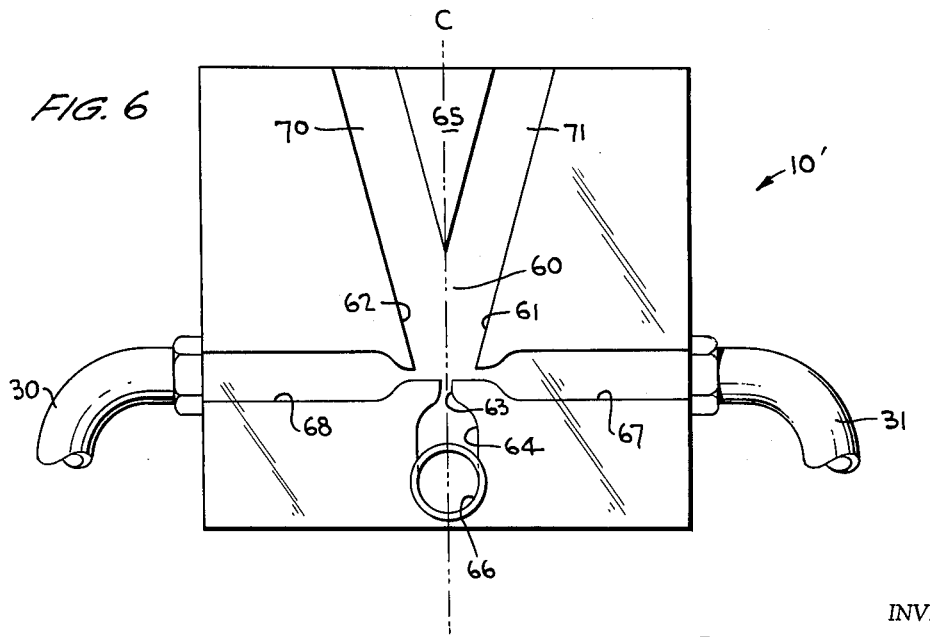
Figure 5:
Figure 5A:
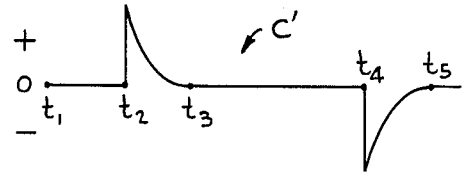

FIGURES 5 and 5a respectively illustrate a square wave input signal and the differentiated output signal produced by a typical pure fluid differentiator comparator constructed in accordance with the present invention; and FIGURE 6 is a plan view of another type of pure fluid comparator which may be employed in accordance with this invention.

Figure 1:
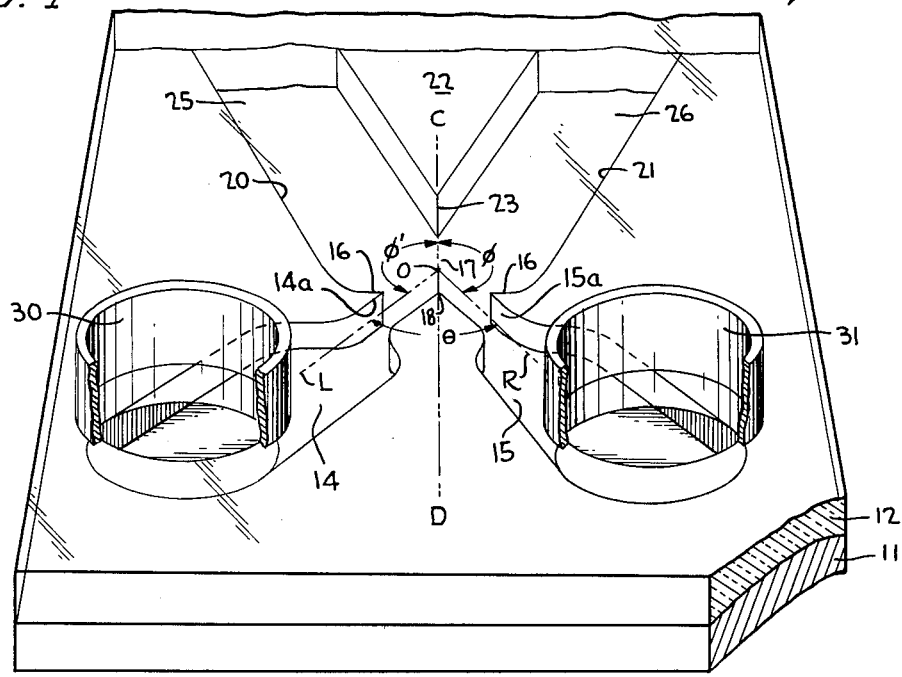
FIGURE 1 is a plan view of one embodiment of the pure fluid comparator which may be employed in accordance with this invention.

Referring now to FIGURE 1 of the accompanying drawings for a more complete understanding of the invention, a pure fluid comparator 10 is formed in a flat plate 11 by molding, milling, casting or by other techniques which will form the necessary passages and cavities therein.

The plate 11 is covered by another flat plate 12 which is sealed to the plate 11, for instance, by machine screws, clamps, adhesives, or by any other suitable means. It is of primary importance, that the connection between the plates be fluid-tight so that the fluid is confined to flow only in one plane within the passages and cavities formed in the plate 11. The plates 11 and 12 may be composed of any material compatible with the fluid employed, and may, for example, be composed of metal, plastic, ceramic or other suitable material. The fluid employed my be gaseous or liquid or combinations thereof, and as a matter of convenience, air and water may be employed.

The fluid comparator 10 includes a pair of nozzles 14 and 15 which terminate in orifices 14a and 15a, respectively, the orifices communicating with two opposed end wall sections 16 of a stream interaction chamber 17. The nozzles 14 and 15 are preferably of identical size and shape. The orifices 14a and 15a are preferably of equal cross-sectional areas and one side of each orifice 14a and 15a converges to form a common edge 18 located symmetrically with respect to sidewalls 20 and 21 of the interaction chamber 17. The interaction chamber 17 is enclosed by the flat plate 12 and the bottom face of the chamber 17 is also planar so that chamber 17 has an essentially rectangular cross-section. The edge 18 is essentially in horizontal alignment with terminal regions of the end wall 16. The sidewalls 20 and 21 are spaced remotely from the orifices 14a and 15a so that essentially no interaction and no resulting boundary layer lock-on occurs between the streams issuing from thee nozzles 14 and 15 and the sidewalls 21 and 20, respectively. Located downstream of the orifices 14a and 15a is a flow divider 22 having the apex 23 thereof coincident with a reference or centerline CD, the centerline CD being inscribed symmetrically through the interaction chamber 17 and intersecting the edge 18. The lines LO and RO are taken symmetrically through the nozzles 14 and 15, respectively and respectively represent the longitudinal axes of these nozzles and intersect the line CD at point O. The angle $\theta$ is formed between the lines OL and OR and the centerline CD bisects that angle. In the particular embodiment illustrated, the distance from the edge 18 to the apex 23 is approximately three orifice widths and the angle $\theta$ is preferably an angles less than 180°. Outlet flow passages 25 and 26 are defined between the sidewalls 20 and 21, extended, and the opposite sides of the diverging flow divider 22, respectively. The angles $\theta$ and $\theta'$ formed by the lines COR and COL are greater than 90° to the unit centerline COD. The nozzles 14 and 15 are angularly positioned with respect to each other and with respect to the interaction chamber 17, as illustrated, so that the passages 25 and 26 receive fluid from the nozzles 15 and 14, respectively, in the event there is absence of interacting flow issuing from one or the other of the nozzles. Fluid pressure signals are supplied to the comparator 10 through inlet ducts or tubes 30 and 31 which are threadedly connected in the plate 12 and communicate with the input nozzles 14 and 15, respectively to discharge fluid to these nozzles.

To bias or weight the input signals the angle $\phi$ and $\phi'$ can be changed by shifting the position of the flow divider 22 relative to the edge 18, and by increasing or decreasing the angle formed by the intersection of the lines OR and OD relative to the angle formed by the interaction of the lines OL and OD, that is, by changing the angular position of one input nozzle with respect to the other relative to the centerline CD.

Assume for the purpose of illustrating the functioning of the fluid pressure comparator that the fluid input signal supplied to the duct 31 is maintained at a constant pressure and that the duct 30 receives a variable or fluctuating pressure input signal.

Figure 2:
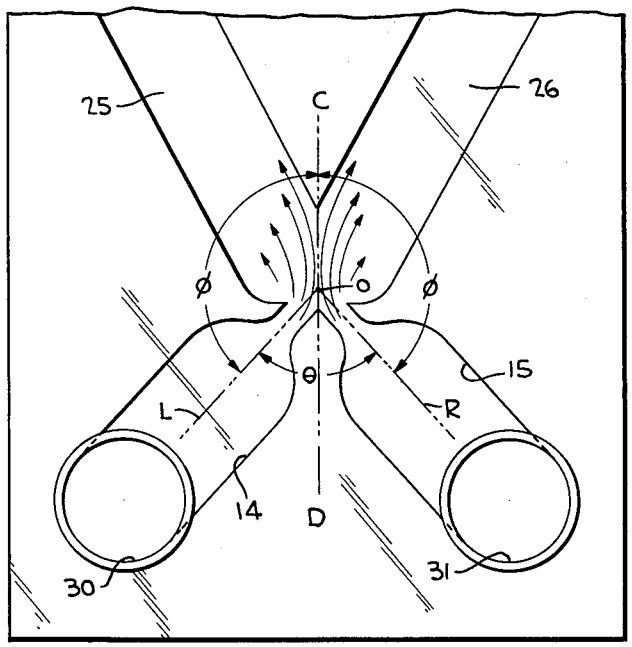
FIGURES 2 and 3 illustrate flow patterns of fluid in the pure fluid comparator shown in FIGURE 1 under two different operating conditions.

With reference to FIGURE 2, it will be evident that when the fluctuating fluid pressure in the tube 30 equals the constant pressure of fluid in the tube 31, the two streams from the nozzle 14 and 15 are mutually deflected by stream interaction through equal angles and combine to form a composite stream directed towards the apex 23 along centerline CD of the unit. The combined stream is divided equally by the divider 22 and flow into the passages 25 and 26 is symmetrical. This flow condition can also be considered a null condition.

Figure 3:
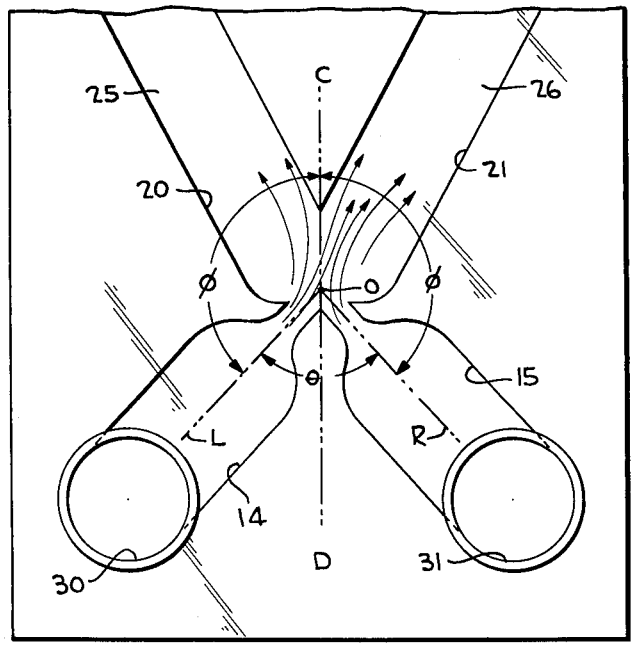

When pressure of the fluid in the tube 30 becomes slightly greater than the pressure of fluid in the tube 31, the larger analog type of fluid signal issuing from the nozzle 14 deflects the stream from the nozzle 15 as shown in FIGURE 3, toward the wall 21 and a small quantity of fluid from the nozzle 14 crosses the centerline CD and enters the output passage 26 along with all of the fluid from the nozzle 15. The additional fluid flow in the output passage 26 produces flow and pressure differentials between the output passages 25 and 26 which are proportional to the pressure differentials in the nozzles 14 and 15.

When the pressure in the nozzle 14 is less than the pressure in the nozzle 15, the greater pressure differential produced by fluid issuing from the nozzle 15 will cause an asymmetrical flow condition wherein all of the fluid from the nozzle 14 enters the passage 25 along with a portion of the fluid from the nozzle 15. Thus, the fluid issuing from the output passage 25 will have a greater flow and pressure than the fluid issuing from the passage 26, the differential in flow or pressure between the fluid streams being proportional to the differentials in pressures in the nozzles 14 and 15 respectively.

As mentioned hereinabove, a low residual hysteresis characteristic is an advantageous characteristic of a comparator. In order to clearly understand what is meant by the term "residual hysteresis" as applied to pure fluid components, assume that a stream of fluid is flowing through the interaction chamber 17. The stream entrains the fluid on both sides of the chamber and tends to reduce the pressure on each side of the chamber as a result of the extraction of fluid due to entrainment. If the streams issuing from the orifices 14a and 15a have equal parameters, the resulting combined stream divides equally with respect to the apex of the divider 22. The stream of fluid is then equally effective in removing fluid from both sides of the chamber so that any reduction in the pressure in the regions between the two sidewalls 20 and 21 of the interaction chamber 17 and the sides of the fluid stream is equal. However, if the two input streams are of different parameter; say for example, of different pressures, the combined stream will be deflected towards one sidewall rather than the other, for instance, closer to the sidewall 20 than the sidewall 21. Due to the fact that the pressure region between one side of the stream and the sidewall 20 becomes smaller than the corresponding pressure region on the other side of the stream, and the pressure in the region between the one side of the stream is reduced to a greater extent than the pressure in the region between the other side of the stream and the sidewall 21. This results in a differential in pressure across the combined stream which insofar as the comparator is concerned has the same effect as a differential in pressure between the two input signals. For designs where this effect is significant the apparatus cannot go through null directly when the pressure signals from the two orifices are equal since the differential in pressure created by the stream being closer to one sidewall than to the other sidewall must also be overcome.

This phenomenon has been hitherto referred to as the residual hysteresis characteristic of the fluid comparator and represents the percent change in a parameter required to switch from a null condition. Since hysteresis tends to make the comparator 10 less sensitive to changing input signals, the amount of hysteresis should preferably be minimized by providing sufficient setback to the sidewalls of the interaction chamber, or by venting the chamber 17 to external ambient pressure by adding holes in plate 12 at location close to sidewalls 20 and 21.

Figure 4:
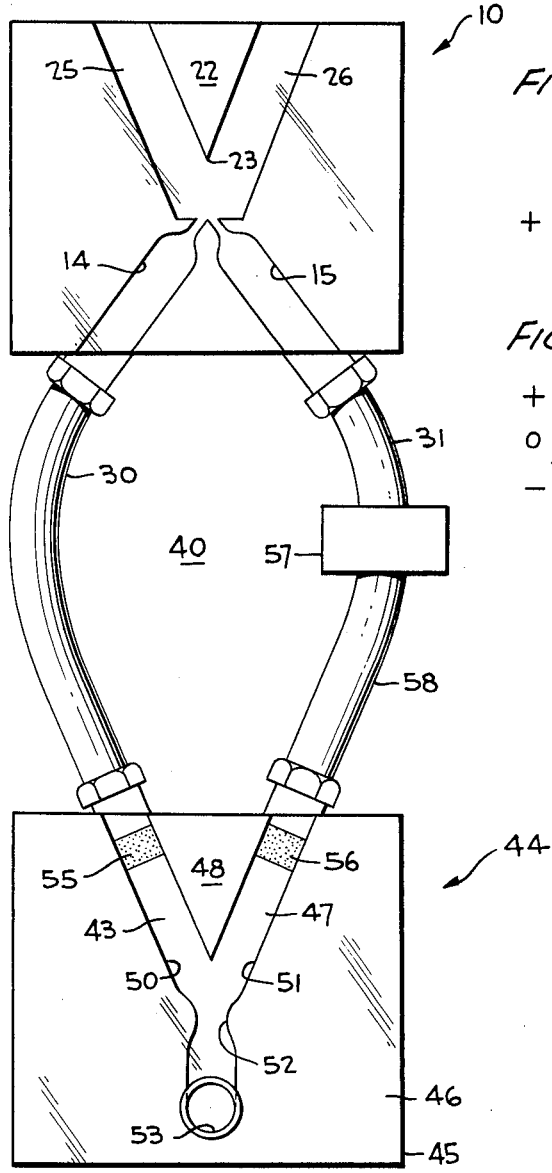
FIGURE 4 is a plan view of a pure fluid differentiator comparator in accordance with this invention.

FIGURE 4 of the accompanying drawings illustrates a typical pure fluid comparator differentiator constructed in accordance with this invention. The nozzles 14 and 15 of the fluid comparator 10 are threadedly connected to ducts or tubes 30 and 31, respectively. The tube 30 is threadedly connected to an output passage 43 of an input signal divider unit 44. The signal divider unit 44 is formed of a sandwich type structure of two or more flat plates and may be formed by the same method and means as the component 10; that is, the essentially Y-shaped configuration may be provided in one flat plate 45 which is covered by a second flat plate 46, the two plates being sealed one to the other in a fluid-tight relationship.

The output passages 43 and 47 are partially formed by the diverging sides of a flow divider 48, the flow divider 48 being preferably located symmetrically with respect to the symmetrically diverging walls 50 and 51 of the output passages 43 and 47, respectively, and with respect to the input orifice 52. A tube 53 is threadedly connected in the plate 46 and communicates with the input orifice 52 for supplying fluid signals to that orifice. The diverging walls 50 and 51 are at an angle, for instance, less than $\pm 7\frac{1}{2}°$ relative to the centerline of the orifice 52, so that flow does not tend to separate from walls 50 or 51. The source of the input signals supplied to the orifice 52 is ordinarily a matter of choice, the input signals may, for example, be control fluid signals from another pure fluid component or any other desired source. The input signal may be supplied to the comparator differentiator 40 to control the operation of other fluid systems staged to the differentiator comparator 40 outputs.

A pair of fluid resistors that may, for example, take the form of porous plugs 55 and 56, or constrictions in the tubes 30 and 58, are positioned in the output passages 43 and 47, respectively; or the resistors may be located in the tubes 30 and 58. The fluid resistors 55 and 56 are provided to insure a proper backloading and an impedance matching between the unit 44 and the comparator 10.

A fluid capacitance, referred to generally by the numeral 57, is positioned between the ends of the tube 31 and the tube 58 which is threadedly connected at one end thereof to the output passage 56. The term "fluid capacitance" as used herein is inclusive of a class of fluid energy storage devices that store fluid potential energy. In general, the potential energy of the fluid in a fluid capacitance increases as a result of supplying additional fluid to the capacitance. Conventional forms of fluid capacitances include fluid storage tanks, deformable diaphragms, or elastic walled members such as tubes or containers. Since no mechanical moving parts are preferred, the fluid capacitance is shown as comprising a fluid storage tank for use with a compressible fluid. Some of the energy supplied capacitance 57 by tube 58 will be stored thus decreasing flow to nozzle 15.

The fluid capacitance will continue to store fluid until the energy of the fluid being discharged by the capacitance to nozzle 15 exceeds the energy of the fluid being supplied to the capacitance by tube 58. The potential energy of the fluid stored in the capacitance 57 will cause the capacitance to continue to discharge its fluid into nozzle 15 after energy flow from tube 58 has ceased. This provides a phase shift between supply of fluid to nozzle 14 and supply to nozzle 15 whenever there is a transient in flow to orifice 52.

With regard to the operation of the pure fluid differentiator comparator 40, assume that a positive fluid input pulse having a substantially square or rectangular pressure wave form C, FIGURE 5, is supplied to the tube 53. The pulse issues as a fluid stream from the input nozzle 52. During the period from $t_1$ to $t_2$ the flow divider 48 divides the fluid jet equally into the output passages 43 and 47 so that equal magnitude fluid streams flow through the fluid resistors 55 and 56 and into the tubes 30 and 58, respectively. The fluid in the capacitance 57 will have a constant energy level during the interval from $t_1$ to $t_2$ and equal magnitude fluid streams will be issuing from both nozzles 14 and 15, causing a null to be produced in the comparator 10 as shown in FIGURE 5a.

At time $t_2$ the amplitude of the input signal C is shown to increase sharply and consequently the magnitude of fluid stream issuing from the nozzle 14 increases sharply, since the resistor 55 has little delaying effect on the rate of pressure increase. The capacitance 57 receives all of the increased energy and initially stores some of this energy received so that a smaller increase in pressure is applied to fluid issuing from the nozzle 15 as compared to nozzle 14 at the same instant. Thus, the magnitude of the fluid stream issuing from the nozzle 14 will displace all fluid issuing from the nozzle 15 into the output passage 26 along with some of the fluid issuing from the nozzle 14 in an amount depending upon the amplitude of the change of signal C applied to orifice 52.

As the capacitance 57 approaches equilibrium where it releases the energy of the fluid received as fast as such energy is supplied, the magnitude of the stream issuing from the nozzle 15 increases forcing the stream from the nozzle 14 to the null position as discussed hereinabove. During the time interval from $t_2$ to $t_3$, FIGURE 5a, when the stream issuing from the nozzle 15 is increasing in magnitude, the combined stream is displaced essentially as a beam across the apex 23 of the divider 22, the displacement of the beam being a function of the rate of change of the particular changing input signal parameter. For example, if this input parameter is pressure P, then the displacement of the beam will be a function of $dP/dt$.

Assuming that the output parameter is flow, the asymmetrical displacement of the streams across the apex 23 will cause a proportional change of fluid flow in the output passage 26. As illustrated in FIGURE 5a, the output wave C issuing from the passage 26 will have a positive amplitude during the time interval from $t_2$ to $t_3$ which corresponds to the differential $$+\frac{dP}{dt}$$

of the input pressure signal C applied to orifice 52.

At the time interval $t_3$, FIGURE 5a, the amplitude of the input wave C, FIGURE 5, is constant and the pressure in the fluid capacitance 57 has built up so that the capacitance 57 is discharging fluid into the nozzle 15 at the same flow rate and pressure as fluid issuing from the nozzle 14. As a result, at time $t_3$ a null is again produced by the interacting fluid streams under equal pressures in the comparator 10 so that both output passages 25 and 26 receive equal amounts of fluid. The rate of change of pressure in both output passages 25 and 26 will then be zero and the amplitude of the difference in flow through channels 25 and 26, which is the output signal C′, FIGURE 5a, during the interval from $t_3$ to $t_4$ becomes zero amplitude and remains the value of zero as long as the amplitude of the input signal remains substantially constant.

At time $t_4$, FIGURE 5, the amplitude of the input signal C drops off sharply to a smaller positive pressure and the fluid pressure supplied by the tube 30 to the nozzle 14 correspondingly drops off sharply. However, the fluid capacitance 57 tends to maintain flow of fluid issuing from the nozzle 15 and therefore the overriding fluid stream issuing from the nozzle 15 drives the fluid stream from the nozzle 14 substantially as a beam across the apex of the divider 22 and a larger portion of the total fluid flow thereby enters the output passage 25. The diversion of a higher portion of the stream issuing from the nozzles 14 and 15 into the output passage 25 accounts for the negative amplitude of the curve C′ during time $t_4$ to $t_5$. Between the interval $t_4$ to $t_5$, the fluid from the capacitance 57 will be discharging from a higher energy level and therefore the pressure on the fluid issuing from the nozzle 15 will also be decreasing at the same rate. Since the nozzle 14 is also issuing fluid the effect of decreasing pressure in the nozzle 15 is to cause decreasing displacement of the combined fluid stream from the null position. At time $t_5$ the streams from both nozzles 14 and 15 will be under the same pressure and flow conditions and a null condition again occurs whereby both passages 25 and 26 receive fluid streams having substantially equal pressure.

The negative amplitude of curve C′ from time $t_4$ to $t_5$ corresponds to an approximation of the $$-\frac{dP}{dt}$$

which occurred in curve C at time $t_4$ i.e. a decrease of pressure applied to orifice 52. After time $t_5$ the slope of the curve C′ is zero which corresponds to the zero slope of the input wave form C.

It will be evident from the foregoing description that the phase shift effected primarily by the capacitance 57 will provide that in general, the unit 40 will compare and differentiate any type of signal C applied to the orifice 52 passing as a variable any one of the three fluid parameters mentioned hereinabove so as to provide an appropriate difference output signal C′ at output passages 25–26.

The comparator 10 illustrates one type of pure fluid comparator which may be employed in this invention. FIGURE 6 of the accompanying drawings illustrates another type of comparator referred to by the numeral 10′ which may also be connected to receive fluid signals from the tubes 30 and 31. The pure fluid comparator 10′ is basically a pure fluid amplifier such as disclosed in U.S. Patent 3,039,490 and includes an interaction chamber 60 and a pair of diverging sidewalls 61 and 62 set back remotely from the orifice 63 of a power nozzle 64. A divider 65 is symmetrically positioned between the sidewalls 61 and 62 and the power nozzle 64 and is substantially symmetrical with respect to a centerline CL taken through the apex of the divider 65. A tube 66 supplies fluid to the power nozzle 64 and the fluid stream issuing from the nozzle 64 is displaced by fluid streams issuing from control nozzles 67 and 68 respectively, into which the ends of the tubes 31 and 30 are respectively threadedly connected. Output passages 70 and 71 receive varying amounts of fluid as the power stream issuing from the power nozzle 64 is displaced by fluid jets issuing from the control nozzles 67 and 68 respectively, the differentiating action of the assembly 40′ using comparator 10′ being identical to the aforedescribed differentiating action of the assembly 40 using comparator 10. The displacement of the greater energized power stream by the lesser energized control jets in the comparator 10′ does however provide a gain during operation, as will be evident to those working in the art.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A pure fluid system comprising a pure fluid proportional amplifier having a stream interaction chamber and plural nozzles positioned to issue interacting fluid streams into said chamber, means connected to at least some of said nozzles for dividing fluid input signals received by said means into plural input signals directed to said nozzles, and means for supplying fluid input signals to said means connected to said nozzles, said means connected to said nozzles having further means for delaying fluid input signals directed to one of said nozzles by said means relative to fluid input signals directed to the other of said nozzles.

2. The combination according to claim 1 further comprising a pair of output passages having ingress openings located adjacent an end of said interaction chamber remote from said nozzles.

3. A pure fluid system comprising a comparator having a stream interaction chamber, plural nozzles positioned to issue interacting fluid streams into said chamber, means connected to at least some of said nozzles for dividing fluid input signals received by said means into plural input signals directed to said nozzles, and means for supplying fluid input signals to said means connected to said nozzles, said means connected to said nozzles having further means for delaying fluid input signals directed to one of said nozzles by said means relative to fluid input signals directed to the other of said nozzles.

4. The combination according to claim 3 further comprising a pair of output passages having ingress openings located adjacent an end of said interaction chamber remote from said nozzles.

5. The combination according to claim 4 wherein said nozzles and said output passages are located generally symmetrically relative to a centerline of said comparator.

6. The combination according to claim 5 wherein said nozzles form acute angles relative to said centerline.

7. The combination according to claim 3 wherein said nozzles comprise two nozzles lying at equal acute angles relative to a centerline of said comparator.

8. The combination according to claim 3 wherein the time delay introduced by said means for delaying is short relative to the duration of the input signals.

References Cited by the Examiner

UNITED STATES PATENTS

| | | | |
|---|---|---|---|
| 3,001,539 | 9/1961 | Hurvity | 137—81.5 |
| 3,001,698 | 9/1961 | Warren | 137—81.5 |
| 3,094,876 | 6/1963 | Hastings | 137—81.5 |
| 3,155,825 | 11/1964 | Boothe | 137—81.5 |
| 3,177,888 | 4/1965 | Moore | 137—81.5 |
| 3,182,676 | 5/1965 | Bauer | 137—81.5 |

M. CARY NELSON, *Primary Examiner.*

LAVERNE D. GEIGER, *Examiner.*

W. CLINE, *Assistant Examiner.*